United States Patent

[11] 3,630,494

[72] Inventor Robert J. Patton
2812 Poplar Drive, Springfield, Ohio 45504
[21] Appl. No. 54,096
[22] Filed July 13, 1970
[45] Patented Dec. 28, 1971

[54] MIXING DEVICE
6 Claims, 5 Drawing Figs.
[52] U.S. Cl. .................................................. 259/177 R, 259/88
[51] Int. Cl. ............................................. B28c 5/18
[50] Field of Search ......................................... 259/28, 60, 177, 176, 175, 3, 14, 15, 30, 31, 57, 58, 81, 82, 88, 89, 90; 279/28, 60, 123, 121

[56] References Cited
UNITED STATES PATENTS
770,859  9/1904  Siegel ........................... 259/88
2,599,852  6/1952  McClain ....................... 259/57
2,813,705  11/1957  Parish ........................... 259/176
2,944,799  7/1960  Larson ......................... 259/177

Primary Examiner—Robert W. Jenkins
Attorney—Dybvig & Dybvig

ABSTRACT: Mortar is mixed in an ordinary bucket mounted on a rotatable support and a nonrotatable mixing blade located in the bucket. The bucket is supported on a base by a power operated support member and gripped thereto by an inertia operated chuck. In operation, the bucket can be removed without manipulation of the chuck even while the support is rotating. A mixing blade is mounted on a vertically movable bracket and can be manually raised or lowered relative to the bucket, and when raised may be pivoted away therefrom. The mixing device is primarily intended for use in mixing mortar, for which purpose an electric drive motor with a gear reducer is provided for rotating the vessel at approximately 40 revolutions per minute.

Patented Dec. 28, 1971 3,630,494
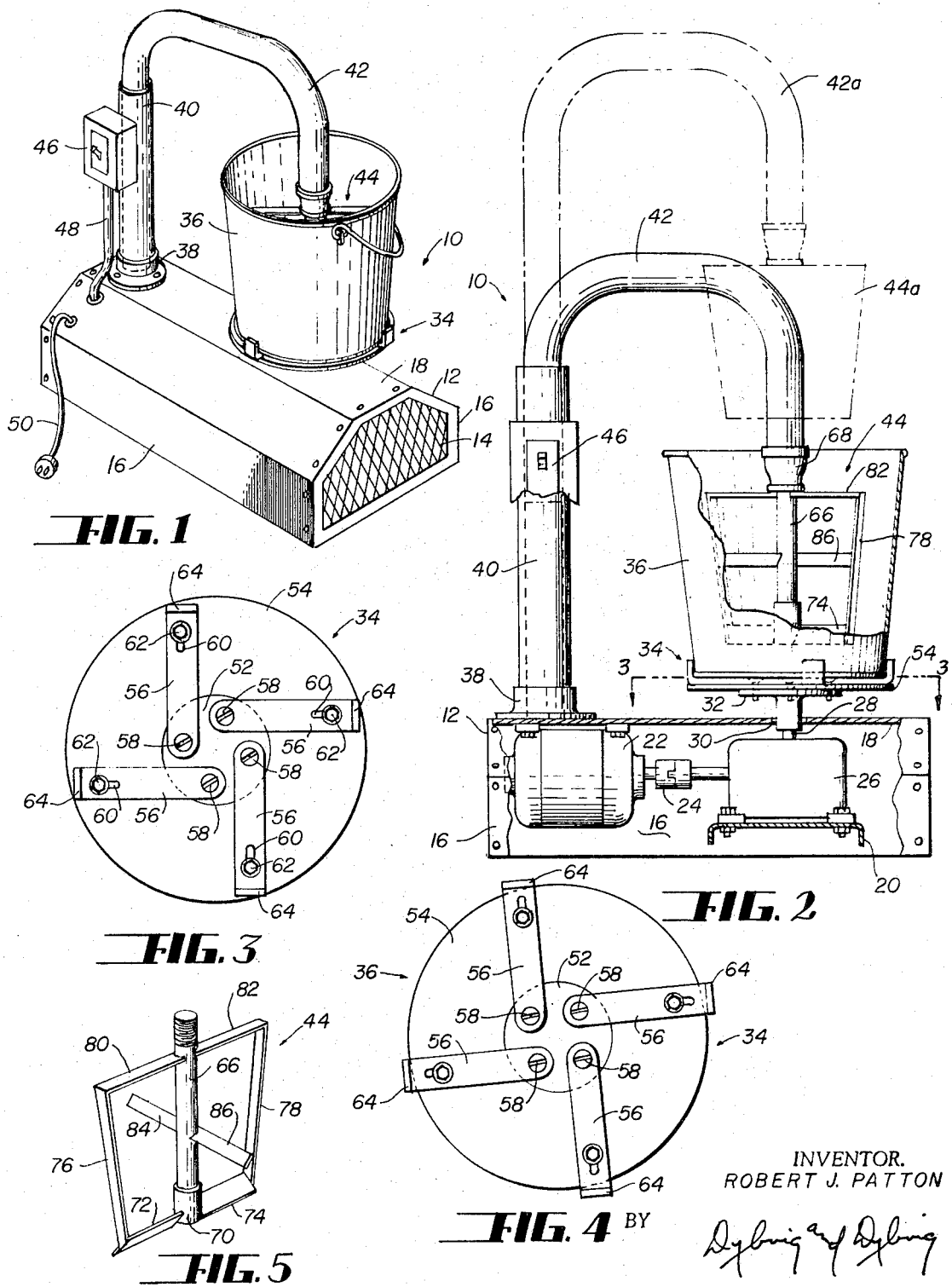
INVENTOR.
ROBERT J. PATTON
BY
HIS ATTORNEYS

MIXING DEVICE

BACKGROUND OF THE INVENTION

This invention relates to a mixing device and more particularly to a device especially adapted for mixing mortar.

Mortar is commonly mixed in a tray, the mixing being accomplished by the use of a simple tool such as a hoe. After the mortar is mixed it is normally transferred to a bucket or the like for use by bricklayers or stone masons.

The need exists for a simple yet rugged mortar-mixing device which can easily be used at a job site, does not require frequent cleaning, and is relatively portable.

SUMMARY OF THE INVENTION

In accordance with this invention, such a device is provided for supporting an ordinary bucket in which the mortar is mixed. The same bucket can be removed from the mixing device directly for the use of the bricklayer or stone mason. For this purpose an inertia operated chuck is associated with the support for the bucket. The chuck has automatically operating dogs for gripping the lower margins of the mixing vessel when the vessel is placed upon the support and the support is rotated.

A nonrotating mixing blade is used which is mounted on a bracket having a generally inverted J-shape and one leg of which is slidable within a post adjacent the support for the mixing vessel. During the mixing operation the mixing blade is lowered into the mixing vessel and the support and, accordingly, the chuck and the mixing vessel are then rotated. After the mixing is complete, the mixing blade is raised by an upward movement of its support bracket. The mixing vessel can then be removed simply by grabbing its bail and pulling it upwardly away from the chuck. If convenient, the mixing blade can be moved from overhead the mixing vessel simply by rotating the inverted J-shaped bracket about the axis of the post.

A power-operated drive is provided in the form of an electric drive motor and a speed reducer drivingly engaging a spindle for the vessel support. The mixing of mortar should proceed slowly and it is found that the mixing vessel should be rotated at a speed on the order of 40 revolutions per minute. An on-off switch for the motor can conveniently be mounted on the post which slidably receives the support bracket for the mixing blade.

Due to the highly viscous, cementitious nature of mortar, a unique mixing blade is preferably used. The blade includes side and bottom scraper members canted to cause the mortar or material being mixed to be moved away from the sides and the bottom of the mixing vessel. For rigidity, the bottom scrapers are aligned along a common horizontal axis and the lower ends of the side scrapers are connected to the outermost ends of the bottom scrapers. Brackets or arm members which are generally parallel to the bottom scrapers connect the upper ends of the side scrapers to a central support. The upper arms or brackets contribute to the agitation of the vessel contents. Furthermore, an agitator blade is preferably provided intermediate the upper brackets and the bottom scrapers but aligned on an axis which intersects the central support perpendicular to the axis of intersection of the bottom scrapers with the central support. The agitator blades are also canted to, in effect, lift the contents being mixed.

Generally stated, it is an object of this invention to provide a mortar mixing device having the conveniences and advantages of that briefly described above. Other objects and advantages will become apparent from the following description and the drawings.

BRIEF DESCRIPTION OF THE DRAWINGS

FIG. 1 is a perspective view of a mixing device in accordance with this invention and a mixing vessel with the parts shown as they would be positioned during use.

FIG. 2 is a side elevational view with parts broken away and in cross section of the device and vessel shown in FIG. 1.

FIG. 3 is a plan view of a vessel supporting chuck forming part of the mixing device as viewed in the direction of arrows 3—3 of FIG. 2.

FIG. 4 is a plan view similar to FIG. 3 but showing parts of the chuck in a different position.

FIG. 5 is a perspective view of the preferred embodiment of a mixing blade for use in the mixing device of this invention.

DESCRIPTION OF THE PREFERRED EMBODIMENT

With reference to FIGS. 1 and 2, a mixing device in accordance with this invention is generally designated 10 and includes an elongate housinglike support or base 12 made from sheet or other suitable material and having open ends closed by screens such as that designated 14. The support 12 has two sidewalls 16 and a top wall 18. As shown in FIG. 2, a support channel 20 is connected as by welding to the sidewalls 16 beneath the top wall 18 and extends transversely of the longer dimension of the support 12. An electric drive motor 22 is bolted to the underside of the top wall 18 and connected by a coupling 24 through a gear drive located in a gear drive housing 26 bolted to the top of the channel member 20. The gear drive has a vertically oriented output shaft 28 that, as will be further described below, supports and rotates the mixing vessel. The shaft 28 projects upwardly through an aperture 30 in the support top wall 18. The gear drive mechanism may take any suitable form, such devices being commercially available. The drive mechanism is a reduction gear mechanism, preferably resulting in a drive of the output shaft 28 at approximately 40 revolutions per minute.

Affixed as by pins or screws (not shown) to the upper end of the shaft 28 is a support plate 32 having a sleeve portion receiving the shaft 28 and an upper horizontal plate portion, the upper surface of which lies in a plane perpendicular to the longitudinal axis of the shaft 28. The support member 32 supports a chuck assembly generally designated 34 which will be described in greater detail below. The chuck assembly 34 is adapted to support and drivingly engage a mixing vessel, such as an ordinary bucket 36, whereupon rotation of the output shaft 28 is transmitted to the bucket 36 through the support member 32 and the chuck assembly 34.

Mounted on the upper surface of the top wall 18 generally over the motor 22 is a socket 38 for a hollow, vertically extending post 40 that slidably and rotatably receives the longer leg of an inverted J-shaped mounting bracket 42 for a mixing blade generally designated 44. An electrical switch 46 may be mounted on the upper end of the post 40, the switch being connected by circuit means (not shown) partially located in a cable 48 extending from the switch 46 inside of the housing 12. A cord 50 also extends into the housing 12, the cord being adapted to supply ordinary house current for operation of the motor 22. Here it may be noted that the electric circuitry can be entirely conventional and, hence, is not disclosed in detail.

The parts thus far described are shown in FIG. 1 and in full lines in FIG. 2 as they would be in operation. When the electric drive motor 22 is energized, the bucket 36 is caused to rotate relative to the mixing blade 44 to stir the contents of the bucket 36. As indicated by the phantom lines 42a and 44a in FIG. 2, when the mixing is complete the bracket 42 may be manually grasped and raised to retract the mixing blade 44 from the bucket 36. When raised, the bracket 42 may be rotated about the vertical axis of the post 40 to an out of the way position to permit convenient access to the bucket 36.

When used to mix mortar or other highly viscous and relatively heavy substances, it is apparent that the mixing vessel must be firmly clamped to the rotating support. On the other hand, for ease of operation it is desirable that the mixing vessel can be conveniently placed on and removed from its support by one operator whose primary attention, of course, must be directed to handling the bucket. For this reason, the chuck assembly 34 is so constructed that the operator can manipulate the chuck assembly 34 by appropriate movements of the bucket 36.

With reference to FIGS. 2, 3 and 4, the chuck assembly 34 includes a chuck drive member or plate 52 coaxial with the shaft 28. The drive plate 52 is of a considerably smaller diameter than the diameter of the circular base of the mixing vessel or bucket 36. It may be connected to or integral with the support member 32 and overlies the support plate portion thereof. The chuck assembly 34 further includes a chuck control member or plate 54 which is apertured to receive the chuck drive plate 52. The upper faces of the plates 52 and 54 are substantially coplanar and the control plate 54 may partially overlie and thus derive support from the support member 32. Four equally spaced chuck-actuating levers 56 are pivotally connected for movement about a vertical axis at their inner ends to equally, circumferentially spaced points on the chuck drive plate 52 as by pivot pins or bolts 58. The levers 56 are also connected by lost motion connections to the chuck control plate 54, the lost motion connections consisting of longitudinally extending slots 60 adjacent the outer ends of the levers 56 and bolts 62 projecting through the slots 60 and threadedly engaged in circumferentially, equally spaced apertures located adjacent the outer margins of the control plate 54. For reasons which will become apparent, the control member 54 may take other forms than that illustrated; however, the points of connection of the actuating levers 56 thereto must be spaced further from the axis of rotation than the pivot pins 58. Gripping dogs 64 for gripping around the lower end of the bucket 36 are connected to the outermost ends of the levers 56. As illustrated, the gripping dogs 64 may comprise upwardly turned ends of the levers 56.

When the parts of the chuck assembly 34 are positioned generally as shown in FIG. 4, the gripping dogs 64 are spaced sufficiently remote from the axis of the chuck assembly 34 that they would not be in driving engagement with a bucket or other mixing vessel placed thereon. FIG. 4 shows the parts only partially "open." In practice the levers 56 may project radially from the axis of the chuck drive plate 52. In operation, when the bucket 36 is placed upon the open chuck assembly 34, the weight of the bucket is borne by the levers 56. When the electric motor 22 is then energized, the chuck drive plate 52 is positively rotated in a counterclockwise direction as viewed in FIG. 4. The bucket 36 tends, because of inertia, to not rotate and, since there is no direct drive between the chuck drive plate 52 and the chuck control plate 54, the control plate 54 tends to remain in its FIG. 4 position during the initial rotation of the drive plate 52. After the drive plate 52 has rotated through an angle sufficient to cause the gripping dogs 64 firmly to engage the outer margins of the bucket 36, the bucket 36 will rotate with the chuck drive plate 52 and the control plate 54 rotates therewith.

As may be observed from the foregoing description, the control plate 54 serves primarily to maintain the angular separation of the radially outermost ends of the levers 56. The lost motion connections provided by the slots 60 and bolts 62 permit the drive plate 52 to rotate relative to the control plate 54 whereupon the actuating levers 56 are moved from positions whereat they extend generally radially to the axis of the drive plate 52 to positions whereat they are generally tangential to the drive plate 52. Such movement of the levers 56 drives the gripping dogs 64 radially closer to the axis of the drive plate 52. Accordingly, the dogs 64 are drawn tightly into engagement with the outer margin of the bucket 36. It will be appreciated that the size of the bucket will have an effect upon the angle through which the chuck drive plate 52 must rotate before a firm grip on the bucket is obtained and the outer ends of the slots 60 may never reach the extreme end position shown in FIG. 3.

Since the mixing device 10 utilizes the inertia operated chuck assembly 34 described above, it is possible to leave the switch 46 in its "on" position whereby the chuck assembly 34 is constantly rotating. When it is desired to place a bucket with contents to be mixed on the chuck assembly 34, one can merely hold the bracket 42 in its upper position illustrated at 42a and, while grasping the bail of the bucket 36, swing the bottom of the bucket against one of the dogs 64, thereby causing all of the levers 56 to move to generally radial positions. The bucket 36 can then merely be rested on the levers 56 whereupon the inertial operation described above occurs and the dogs 64 tightly engage the bottom rim of the bucket causing it to rotate. After the contents are mixed, the bracket 42 can then again be raised and the bucket removed merely by again grasping its bail and pulling it upwardly and away from the chuck assembly 34. This movement imparted to the bucket will cause the levers 56 to move radially outwardly sufficient to release the grip on the bucket. Accordingly, one using the mixing device of this invention need not deenergize the motor when placing the bucket on, or removing it from, the chuck assembly 34.

As already noted, for best results the bucket 36 should be rotated at a relatively slow speed, on the order of 40 revolutions per minute, for mixing mortar and other similar cementitious materials. Also, it is preferred that the mixing blade 44 have the unique design shown in FIGS. 2 and 5. The blade 44 includes a central post 66 threaded at its upper end and connected to the shorter leg of the inverted J-shaped bracket by a threaded coupling 68. A hub 70 is provided at the bottom of the post 66 and a pair of aligned bottom scraper blades 72 and 74 project radially outwardly from diametrically opposite parts of the hub 70. As shown best in FIG. 5, the bottom scraper blades 72 and 74 are canted so as to have a sloping upper face opposed to the direction of rotation of the bucket 36. Connected to the outer ends of the bottom scraper blades 72 and 74 are upwardly extending side scraper blades 76 and 78, respectively, which are similarly canted so as to present a face opposing the direction of rotation of the bucket. When designed for use with a bucket having a sloping sidewall, such as the bucket 36 illustrated, the side scraper blades 76 and 78 diverge outwardly at their upper ends. For rigidity, the upper ends of the side scraper blades 76 and 78 are connected by bracket arms 80 and 82, respectively, to the center post 66.

When placed in a bucket, the bottom scraper blades 72 and 74 may bear against the bottom of the bucket so as to force the contents upwardly as the bucket rotates. The side scraper blades 76 and 78 lie closely adjacent to or in contact with the inner wall of the bucket to force the contents toward the center. In addition, aligned agitator blade members 84 and 86 project outwardly from diametrically opposite parts of the central post 66 in directions perpendicular to the bottom scraper blades 72 and 74. The agitator blade members 84 and 86 are also canted to cause the contents to be moved upwardly within the bucket. As apparent, when the mixing blade 44 is in a rotating bucket, the contents are caused to move upwardly and inwardly by the blade portions described above, while the contents will naturally, because of gravitational and centrifugal forces, tend to move outwardly and downwardly. As a result, the contents cannot accumulate along the side and bottom of the bucket and a thorough mixing is achieved in a minimum time.

Although the presently preferred embodiment of this device has been described, it will be understood that various changes may be made within the scope of the appended claims.

Having thus described my invention, I claim:

1. In a device for mixing substances having a relatively high viscosity of the type for use with a mixing vessel and including a support for the vessel, power-operated means for rotating the vessel support, a mixing blade adapted to be inserted into the vessel, means for guiding the movement of the mixing blade so that it may be manually raised and lowered relative to the vessel, the improvement comprising an inertia operated chuck assembly associated with the vessel support having dogs for grippingly engaging outer marginal surface portions of the mixing vessel, said digs being connected to actuating levers pivotally connected in relation to said vessel support and operating to grip the marginal surface portions when said support rotates relative to a bucket placed thereon.

2. The improvement of claim 1 wherein said chuck assembly includes a drive member drivingly connected to and for rotation with said support, and a control member surrounding said inner member and rotatable relative thereto, said levers being pivotally connected to said drive member and connected to said control member by lost motion connection means, the upper surfaces of said levers supporting said mixing vessel.

3. The improvement of claim 1 wherein said power operated drive means rotates the support for said mixing vessel at a speed of approximately 40 revolutions per minute.

4. The improvement of claim 1 wherein said mixing blade includes a pair of side scrapers and a pair of bottom scrapers, each of said side and said bottom scrapers being canted relative to the mixing vessel to cause the contents of said vessel to be moved away from the sides and the bottom thereof when it is rotated, the lower ends of said side scrapers being connected to the outer ends of said bottom scrapers.

5. The improvement of claim 4 wherein said mixing blade further includes a central post, the inner ends of said bottom scrapers being connected to said central post, and a pair of bracket arms connecting the upper ends of said side scrapers to said central post.

6. The improvement of claim 5 wherein said mixing blade further includes agitator blades connected to said central post, said agitator blades lying along an axis intersecting said central post and substantially perpendicular to the axis along which said bottom scrapers intersect said central post, said agitator blades being canted to cause the contents of said mixing vessel to be moved upwardly therein.

* * * * *